(12) United States Patent
Shahar

(10) Patent No.: US 7,511,615 B2
(45) Date of Patent: Mar. 31, 2009

(54) SELF-OPERATED PERIMETER INTRUSION DETECTION SYSTEM

(75) Inventor: Haim Shahar, Kiryat Haim (IL)

(73) Assignee: IntelGuard Ltd., D.N. Arava (IL)

( * ) Notice: Subject to any disclaimer, the term of this patent is extended or adjusted under 35 U.S.C. 154(b) by 116 days.

(21) Appl. No.: 11/618,919

(22) Filed: Jan. 1, 2007

(65) Prior Publication Data

US 2008/0157965 A1 Jul. 3, 2008

(51) Int. Cl.
*G08B 13/18* (2006.01)
(52) U.S. Cl. .................. 340/555; 340/556; 340/545.3
(58) Field of Classification Search ......... 340/555–557, 340/541, 545.3, 550, 564; 250/336.1, 200
See application file for complete search history.

(56) References Cited

U.S. PATENT DOCUMENTS

| 6,124,586 | A * | 9/2000 | De Coi ..................... 340/556 |
| 6,801,128 | B1 | 10/2004 | Houston |
| 6,806,811 | B1 | 10/2004 | Readler |
| 6,965,109 | B2 | 11/2005 | Iwasawa |
| 6,965,315 | B2 | 11/2005 | Ikeda |
| 6,998,982 | B2 * | 2/2006 | Iwasawa .................. 340/545.3 |
| 7,208,720 | B2 * | 4/2007 | Hardin et al. ............... 250/221 |
| 7,326,910 | B2 * | 2/2008 | Osako et al. ................ 340/555 |
| 7,326,914 | B2 * | 2/2008 | Pirkl .......................... 340/555 |
| 7,378,641 | B2 * | 5/2008 | Melcher et al. ............. 340/555 |
| 2003/0052254 | A1 * | 3/2003 | Kudo et al. ................. 250/221 |
| 2007/0200699 | A1 * | 8/2007 | Rohbeck ..................... 340/555 |

\* cited by examiner

*Primary Examiner*—John A Tweel, Jr.
(74) *Attorney, Agent, or Firm*—Mark M. Friedman

(57) ABSTRACT

An anti-intruder system which sets up an alarm when being breached, the system comprises of plurality of posts deployed apart forming a peripheral fence, each post carries at least a master optical array and a slave optical array, each optical array has a multiplicity of infra-red transceivers, each transceiver includes a light source and a light detector, the master array is mounted oppositely to and facing the slave array of an adjacent post, wherein the light detector of each transceiver of each optical array is illuminated by more than a single light source of the transceivers of the opposite optical array and the intensity of illumination of the light sources of the transceivers of the master optical array are automatically adjusted according to the light intensity arriving to the light detectors of the transceivers of the slave optical array.

31 Claims, 5 Drawing Sheets

SELF-OPERATED PERIMETER INTRUSION DETECTION SYSTEM

BACKGROUND OF THE INVENTION

This invention relates to an anti-intruder security system and more particularly to a system which provides an optical veil in the IR spectral region which sets up an alarm when being, breached Optical security systems having different configurations for detecting of intrusion into areas protected by light beams are known and operate along borders between countries, in the region of industrial areas and even surround houses.

In general such systems include one or more light sources which illumination is detected by at least one oppositely mounted detector which is located at some distance apart and which activates an alarm when the optical way between the source and the detector becomes blocked.

Both the light sources and the light detectors are usually mounted on posts or towers to form a peripheral or a straight fence, the towers can be equipped with solar cell panels and electrical storage devices to facilitate system operation in remote areas.

Besides, each tower may be connected by a wired or wireless communication network to a control center which allocates the blocked detector, thus estimating the location of the intrusion.

U.S. Pat. No. 6,806,811 to Readler describes an anti-intruder perimeter fence based on IR emitters and detectors (transceivers) arranged in series wherein each transceiver device generates a unique IR signal to distinguish it from another transceiver in the fence.

U.S. Pat. No. 6,965,109 to Iwasawa describes a multistage active infra red sensor in which each detector on a tower is affected only by the illumination of a single emitter in an adjacent tower.

U.S. Pat. No. 6,965,315 to Ikeda describes an anti-thief security sensor assembly in which the angle of an optical unit can be adjusted and U.S. Pat. No. 6,801,128 to Houston describes a tower of an anti-intruder system which may utilize multiple detection beams and which includes a solar cell panel.

Recently, an anti-thief security sensor assembly capable of automatically setting the projecting power from the emitter to the detector was described in U.S. Pat. No. 6,998,982 to Iwasawa.

In most of the mentioned above prior art systems, the configuration and mode of operation is such that the optical pathways which are produced between the light sources and their respective light detectors are parallel to the ground and to each other, i.e. that each light detector is responsive to a beam of illumination which is emitted from a single light source which is mounted oppositely and horizontally to that detector. Such a simple spreading of light beams is shown in FIG. 1.

While this arrangement, in which the light detector becomes completely "darkened" when the appropriate impinging ray of light is being blocked (because rays of light from other sources which were not blocked, do not interfere) has the advantage of a great signal to noise ratio, it has the inherent disadvantage of being inefficient because only a small fraction of the source power (a single beam) is utilized for the assessment of the disturbing event.

Another major problem of the anti-intruder systems described above is a high rate of false alarms, which could have been minimized if the alarm provoking element is identified, e.g. by providing its image.

To overcome this deficiency, a dense optical network, which requires a great number of source/detector pairs, will be needed; this however puts a burden on the cost and on the electrical supply of the system, which impedes its use in a stand-alone mode in remote regions.

Because nowadays systems have a limited number of optical channels which are breached by an intruder they fail to produce a sufficiently detailed image of the intruder and are therefore subjected to a high rate of false alarms.

There is therefore a need in the art for an improved anti-intruder system which will eliminate these mentioned above drawbacks.

The present invention lifts off these drawbacks and provides related advantages

SUMMARY OF THE INVENTION

In accordance to the present invention there is provided an assembly for providing an anti-intruder optical veil, which sets up an alarm when being breached, the assembly comprises of: (a) at least a first and a second array having a multiplicity of infra-red optical transceivers, each transceiver includes a light source and a light detector, the arrays are mounted oppositely facing each other, wherein the light detector of the transceiver in each array is responsive to illumination emitted by more than a single light source of said transceiver of said opposite array, (b) an electronic driver attached to said light source of each said transceiver of said at least first and second array to produce intermitted illumination signals having variable intensity, (c) an analog amplifier attached to said light detector of each said transceiver of said at least first and second array to amplify the signal of the light detector by a variable gain level and (d) a microprocessor unit attached to each said transceiver to adjust power output of said electronic driver according to an output level of said analog amplifier in said opposite array.

In accordance to the present invention there is provided a method for operating an assembly of an anti-intruder system which sets up an alarm when being breached comprising the steps of (a) providing at least a first and a second array having each a multiplicity of infra-red optical transceivers, each transceiver includes a light source and a light detector, the arrays are mounted oppositely and facing each other in a master/slave configuration, wherein the light detector of each transceiver in said array is illuminated by more than a single light source of said transceiver of said opposite array, (b) adjusting intensity of the light emitted by said light source of said transceiver of said master array in response to a level of a signal detected by said light detector of said transceiver of said slave array and (c) imaging an intruding object according to a deficiency in a signal of an affected light detector of said slave array as a result of blocking an optical path between said master array and said slave array by an intruding object.

In accordance to the present invention there is provided an anti-intruder system, which sets up an alarm when being breached, the system comprises a plurality of posts deployed apart forming a peripheral fence, each post carries at least a first master optical array and at least a second slave optical array, each optical array has a multiplicity of infra- red transceivers, each transceiver includes a light source and a light detector, each master array is mounted oppositely to and facing the slave array of an adjacent post, wherein the light detector of a transceiver of said optical array is illuminated by more tan a single light source of the transceiver of the opposite optical array and the intensity of illumination of the light source of the master optical array is automatically adjusted according to the light intensity arriving to the light detector of the slave optical array, the system detects an intrusion event by recognizing an origin light source and a destination light detector of a light beam which was blocked by an intruding object.

It is the aim of the present invention to provide a dense anti-intruder optical veil with a small number of source/detector pairs It is another aim of the invention to provide a cost effective anti-intruder system Yet it is another object of the present invention to provide a power efficient system which can operate in a stand-alone mode for a prolonged duration, It is another aim of the present invention to provide a system capable of providing a recognition pattern of an intruder.

It is still another aim of the present invention to provide a system which can operate in all weather conditions.

Other advantages and benefits of the invention will become apparent upon reading its forthcoming description which is accompanied by the following drawings

DETAILED DESCRIPTION OF THE EMBODIMENTS

The present embodiments herein are not intended to be exhaustive and to limit in any way the scope of the invention; rather they are used as examples for clarification of the invention and for enabling of others, skilled in the art to utilize its teaching.

Figure 2A:
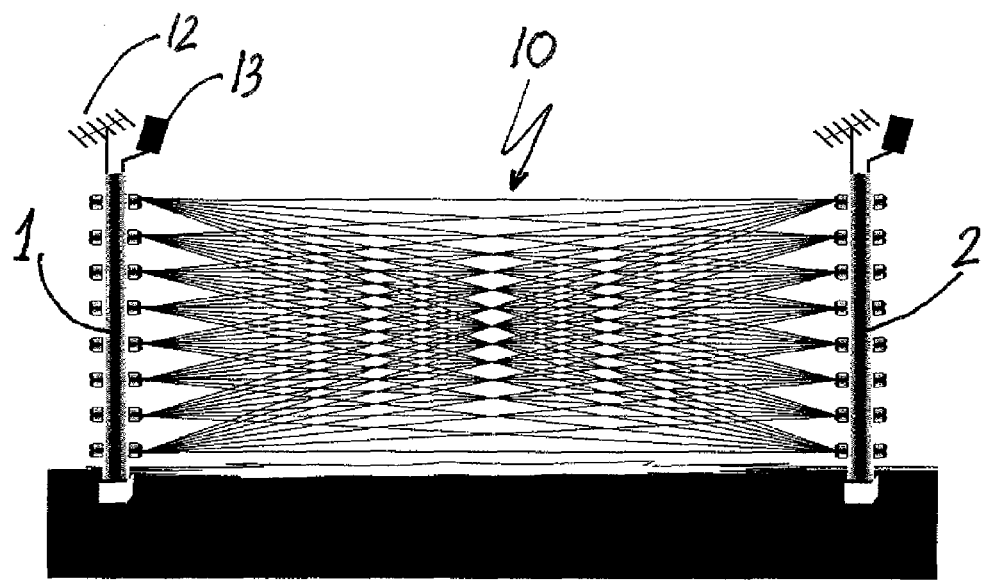
FIG. 2A shows a virtual image of a section of an optical veil with accordance to the present invention.

FIG. 2A shows a virtual image of a segment of an optical veil 10 comprising of, but not limited to 128 relevant rays of light traversing between a first post 1 and a second post 2 which are a unit cell (a sub-system structure which repeats itself periodically) assembly of the anti-intruder system according to the present invention.

Figure 2B:
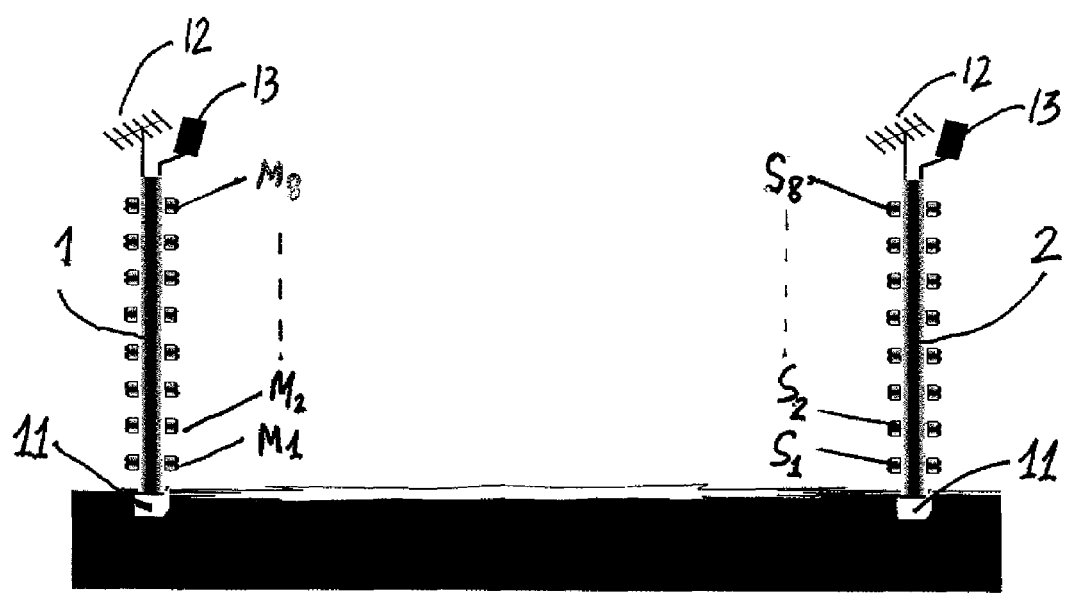
FIG. 2B shows a section of an anti intruder fence in accordance with the present invention.

Some of the assembly components are shown in FIG. 2B.

Post 1 carries a plurality (referred hereinafter as an array) of, but not limited to e.g. 8 optical transceivers (a transceiver is a module which incorporates a light emitting device and a light detecting device) $M_1$, $M_2$, - - - $M_8$ which operate in a configuration mode of a master transceiver which will be explained below.

Post 2 carries a plurality (referred herein after as an array) of, but not limited to e.g. 8 optical transceivers $S_1$, $S_2$, - - - $S_8$ which operate, as will be explained below in a configuration mode of a slave transceiver.

Figure 3:
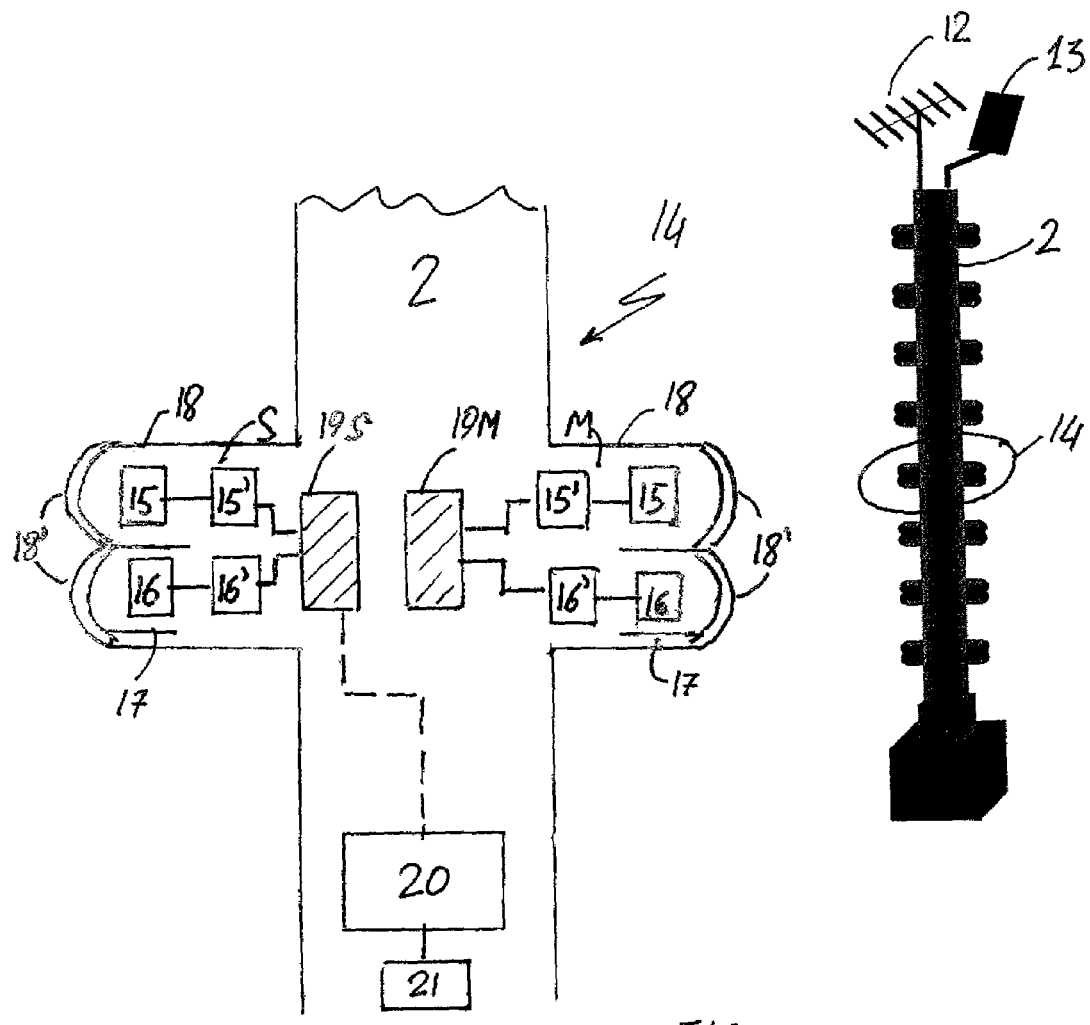
FIG. 3 shows components used to provide an optical veil with accordance to the present invention.

Each transceiver among the M or S group (e.g. as on post 2) which are shown in details in insert 14 in FIG. 3, includes a light source 15 and a light detector 16 in a close proximity to each other mounted in a housing 18 which its front surface is covered by an IR transparent shield of glass or plastics 18'.

Light detector 16 is equipped with a hood 17 to protect it from stray lights Light source 15 can be a LED or solid state diode laser which emits in the IR spectral region, while light detector 16 can be a photodiode, a phototransistor or a photoconductor responsive to illumination in the IR region.

Light source 15 is coupled to a driver 15' which supplies to light source 15 sequences of electrical pulses to emit intermitted light pulses.

Light detector 16 is coupled to a low noise sensitive analog amplifier 16'.

Because optical veil 10 consists of pulsed illumination, the output signal of each amplifier 16' can be compensated (balanced) by adding a DC voltage with opposite polarity, which equals to the amplified DC voltage component of diode 16 which arises as a result of sun light or other DC illuminators such as head lights of automobiles.

Additional components attached to a post such as an RF antenna 12, a solar photovoltaic panel 13 and a base 11 will be elaborated below.

As shown in FIGS. 2A and 2B, each transceiver $S_1$-$S_8$ on post 2 is illuminated by all light sources of transceivers $M_1$-$M_8$ of post 1 and each transceiver $M_1$-$M_8$ of post 1 is illuminated by all light sources of all the transceivers $S_1$-$S_8$ of post 2, thus the shown segment of optical veil 10 includes 128 different optical communication channels (light beams which carry information).

Among these, the 64 light beams which consist of the illumination beams which are emitted from master transceivers $M_1$-$M_8$ on post 1, illuminating slave transceivers $S_1$-$S_8$ on post 2 are referred to as detection beams because as will be explained below, their blockage or obstruction, will produce an intrusion signal.

The other 64 illumination beams emitted from slave transceivers $S_1$-$S_8$ of post 2 illuminating master transceivers $M_1$-$M_8$ on post 1 are referred to as power adjustment beams, because as will be explained below, they control the power emitted by master transceivers $M_1$-$M_8$.

To each transceiver of both master array $M_1$-$M_8$ and slave array $S_1$-$S_8$ there is attached a microprocessor, 19M and 19S respectively which reads the output of amplifier 16' and instructs driver 15' in accordance to that reading.

A suspicion for an intrusion event arises when any of the detection beams is blocked or obstructed as being sensed by any of the light detectors of one of the transceivers $S_1$-$S_8$.

It results from the description above that an object having a final size which breaches optical veil 10 at a certain location between posts 1 and 2 will block certain detection beams $L_{ij}$, where i (i=1 to 8) is the number, of the affected light detector of the slave array on post 2 and j (j=1 to 8) designates the origin of the blocked light beam, i.e. its light source number in the master array on post 1.

Figure 4:
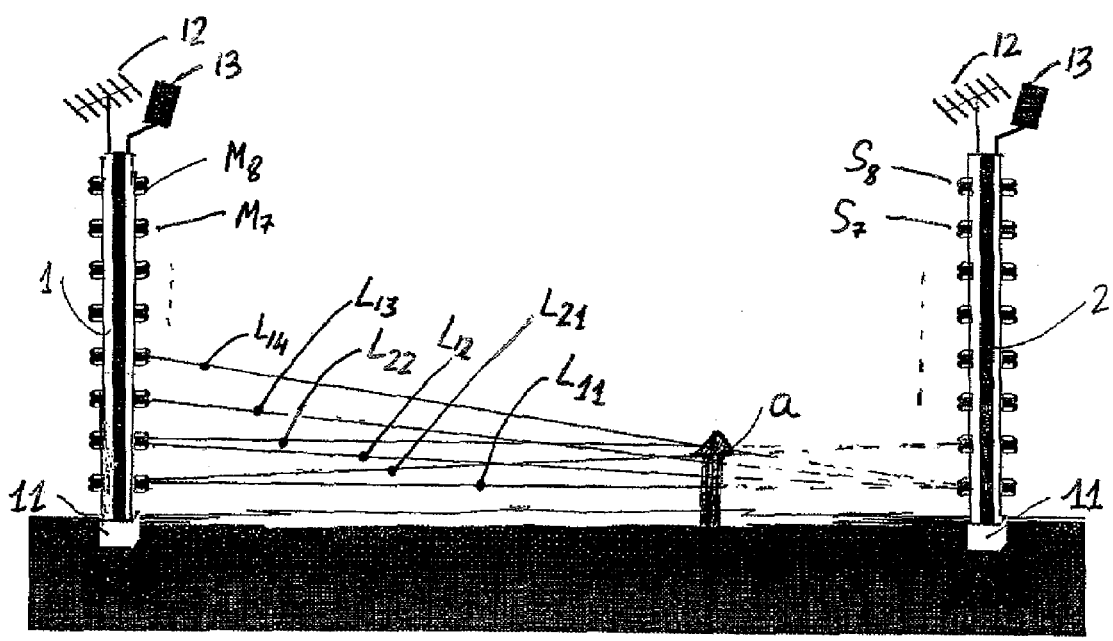
FIG. 4 shows light beams which are affected by an intruding object with accordance to the present invention.

As an example, the detection beams which are blocked by the breaching of an object symbolized by an arrow a which is shown in FIG. 4 are: $L_{11}$, $L_{12}$, $L_{13}$, $L_{14}$, $L_{21}$ and $L_{22}$.

Because light sources 15 of transceivers M are pulsating each in its time in a periodic known sequence as will be explained below, the origin of each ray which arrives to detector 16 of transceiver S (whether blocked or undisturbed) is recognized by microprocessor 19S.

Thus, after each period of consecutive pulsing of master sources 15, the state of an element in a 8×8 matrix L representing all 64 detection beams $L_{ij}$ (e.g. 1 for an unblocked beam and 0 for a blocked beam) can be distinguished.

Such knowledge provides wealthier information about the nature of the intruding object than that which would have been obtained in such a case by prior art systems.

Figure 5:
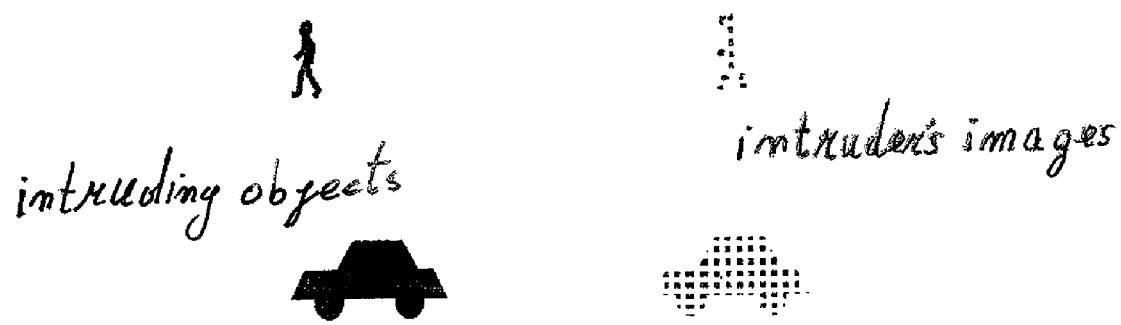
FIG. 5 shows examples of intrusion patterns which are obtained with accordance to the present invention.

Each intruding object projects a characteristic beam blocking profile in the direction perpendicular to the direction of its passage through optical veil 10 thus during a breach the object rolls across the detection beams and produces a set of L matrixes, each as that described above, from which the object "opaqueness" pattern in one dimension is obtained, as shown in FIG. 5.

Such an intruder image is subjected to an automatic recognition procedure by comparing via known fuzzy logic techniques the set L of matrixes which were acquired during an actual intrusion event to sets of L which were created by deliberate breachings of different known entities through the optical veil, e.g. a person, a dog, a car, etc. and which are stored in a database 21 located in a storage medium of a local processor 20 (shown in FIG. 3).

Such recognition is done with the aid of local processor 20 which gets the relevant data described above from all slave microprocessors 19S of e.g. post 2 and accomplishes said above comparing of the sets of L by running an appropriate pattern recognition software.

The procedure which allows an automatic adjustment of the intensity of light emitted by a light source of a master transceiver will now be described.

Light source 15 of each of transceivers $M_1$-$M_8$ and $S_1$-$S_8$ comprises a laser diode or preferably a LED (light emitting diode) in the spectral range of about 750 to about 1600 nm. Light source 15 is fed by a driving power supply 15' wherein the level of power and the power profile of its output is controlled by microprocessor 19S or 19M attached to driver 15' of the appropriate source. Each light source 15 of master transceivers M, e.g. $M_1$-$M_8$ on post 1 emits periodically a characteristic train of about 10 pulses which is recognized by each of microprocessors 19S which is attached to each amplifier 16' of light detectors 16 of slave transceivers S which are positioned on an adjacent post, facing master transceivers $M_1$-$M_8$ and being illuminated by their light sources, e.g. as $S_1$-$S_8$ on post 2.

The output power of driver 15' and hence the intensity of each light source 15 of master transceiver $M_1$-$M_8$ on post 1 is set automatically by microprocessors 19M according to feedback instructions which are carried by the power adjustment beams emitted toward master transceiver $M_1$-$M_8$ by each of light sources 15 of slave transceivers $S_1$-$S_8$ of post 2.

These instructions which comprises of variation in the intensity of the power adjustment beams are detected by the light detectors 16 of master transceivers $M_1$-$M_8$ on post 1 and are interpreted by microprocessors 19M to keep the intensity of light pulses emitted by each of sources 15 of the master transceivers $M_1$-$M_8$ on post 1 just above a dynamically set up threshold value which is sufficient to allow light detectors 16 of slave transceivers $S_1$-$S_8$ which are positioned on post 2 to operate within a good signal to noise ratio, wherein this required threshold is determined by the actual visibility between the posts which changes as a result of changes in transmittance conditions (dust, rain, mist, etch) or components aging.

The feedback arrangement described above is power efficient and enables to produce a section of an anti-intruder optical veil between posts having eight master and eight slave transceivers using a power of less than about 1 W per post.

Figure 6:
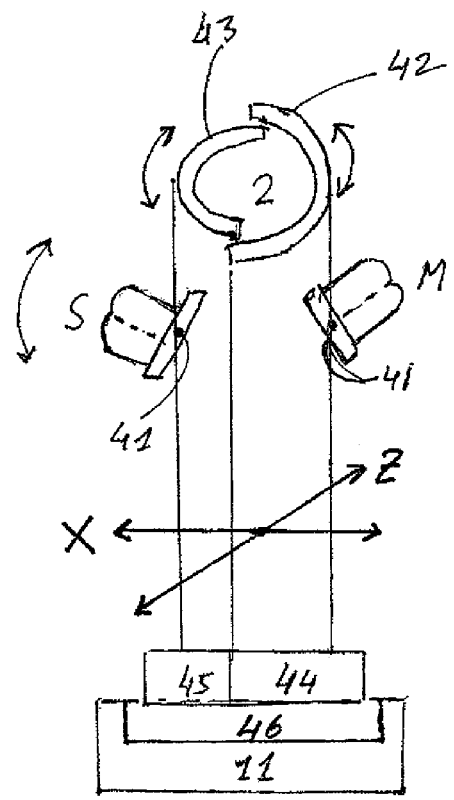

For further reduction of the power needed, each of post 1 and 2 are equipped with alignment mechanisms to optimize optical communication between the master and slave transceivers, this is shown in FIG. 6.

Firstly, each transceiver can be flipped up and down on pivotal axes 41, secondly, each post is split into two sections, one section 42 which carries master transceivers M and a second section 43 which carries slave transceivers S.

Each of sections 42 and 43 is mounted on its own base ball bearing 44 and 45 respectively and can be rotated independently around its long axis perpendicular to ground, manually or with the aid of a motor (not shown).

Besides, each of half sections 42 and 43 includes a mechanism (not shown) which adjusts the distance between base 11 and its base ball bearing 44 and 45 respectively, thus both the orientation and the elevation of a master array of a first post can be adjusted with respect to its corresponding slave array on a second post.

Finally, the position of each post with respect to ground can be adjusted by a manual or motorized mechanism 46 which allows its movement in four azimuthally different directions; the X right and left directions (alone the line between the posts) and the Z back and forth directions (perpendicularly to the line between the posts).

Each post carries on its top a photovoltaic solar panel 13 made of e.g. silicon solar cells, panel 13 provides a power in excess of 1 W when being fully illuminated, It supplies directly power to operate the system during sun light and has power redundancy to charge an electrical storage device such as a rechargeable battery or a super-capacitor (not shown) which are used to provide electrical power to the system at the dark.

In order to increase the efficiency of the solar panel it resides on a "sun follower" mount (not shown) accordingly; 1 hour of sun light provides about six hours of system operation in the dark.

Figure 7:
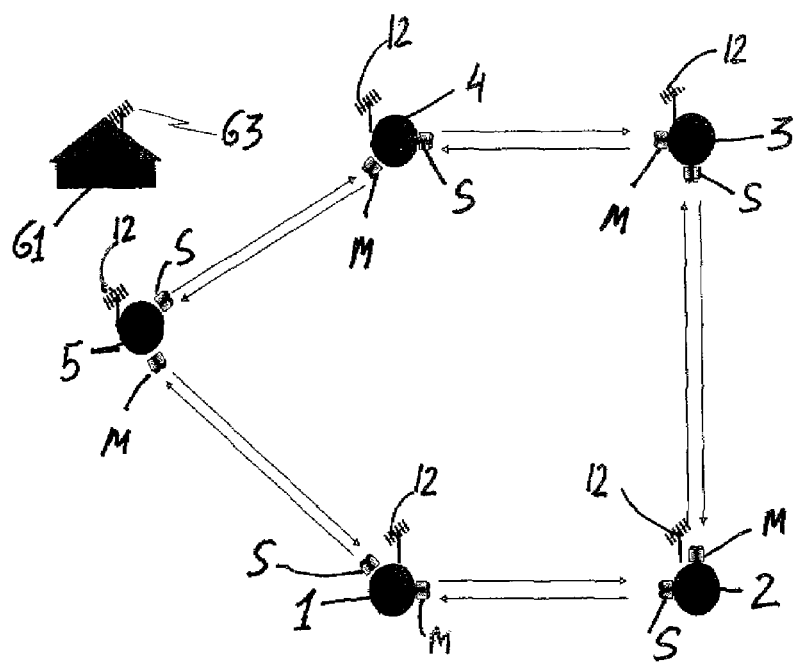
FIG. 6 shows alignment mechanisms to optimize optical communication between transceivers in adjacent posts with accordance to the present invention and FIG. 7 shows a self operated perimeter detection system with accordance to the present invention.
Figure 1:
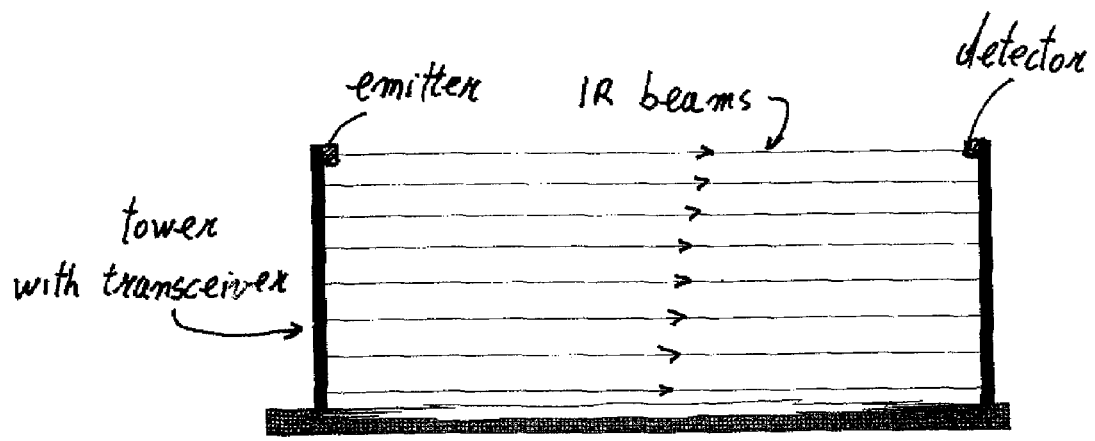
FIG. 1 shows a virtual image of a section of an optical veil with accordance to prior art systems.

For assembling a complete system, several posts such as post 1 and post 2 which were detailed above are needed as is shown in FIG. 7.

FIG. 7 shows a peripheral system which consists of five posts 1-5, communicating optically with each other, each post has a master transceiver array M which source illuminates the detectors of the slave transceiver array S of its next post and a slave array S which is illuminated by the master array M of its previous post.

Each post is fully or partially equipped with components which were described above with regard to post 1 and 2 and can be also equipped with a short-range protection mechanism as e.g. a volume detector or a CCD camera (not shown) to protect the post itself from being sabotaged.

When local processor 20 in any post 1-5 identifies an intrusion event it analyzes the type of the disturbance as explained above and then communicates automatically to a central transceiver module (not shown) in a system control room 61 via a wired or wireless communication network, preferably via a RF communication network using RF antennas 12 (on post i) and 63.

The features of the present invention which were described above enable the system to operate in a stand-alone mode without any need for human intervention for a prolonged duration after its deployment and initial manual alignment.

While the invention has been described with respect to a limited number of embodiments, it will be appreciated that many variations, modifications and other applications of the invention may be made without departing from the spirit and scope of the invention.

What is claimed is:

1. An assembly for providing an anti-intruder optical veil, which sets up an alarm when being breached, the assembly comprises of:
   (a) at least a first and a second array having a multiplicity of infra-red optical transceivers, each transceiver includes a light source and a light detector, the arrays are mounted oppositely facing each other, wherein the light detector of the transceiver in each array is responsive to illumination emitted by more than a single light source of said transceiver of said opposite array,
   (b) an electronic driver attached to said light source of each said transceiver of said at least first and second array to produce intermittent illumination signals having variable intensity,
   (c) an analog amplifier attached to said light detector of each said transceiver of said at least first and second array to amplify the signal of said light detector by a variable gain level and,
   (d) a microprocessor unit attached to each said transceiver of said at least first and second array to adjust illumination power output of said electronic driver according to an output level of said analog amplifier.

2. The assembly as in claim 1 wherein said at least first array is configured as a master array and said at least second array is configured as a slave array.

3. The assembly as in claim 2 wherein said variable illumination intensity of said light source of said transceiver in said master array is automatically adjusted in accordance to said variable illumination intensity arriving to said light detector of said transceiver of said slave array.

4. The assembly as in claim 1 wherein said at least first array and said at least second array have a columnar configuration.

5. The assembly as in claim 1 wherein said at least first array and said at least second array arrays are positioned on a post.

6. The assembly as in claim 1 wherein said light source is selected from the group consisting of a LED and a laser in the IR region.

7. The assembly as in claim 1 wherein said illumination includes Pulsed illumination.

8. The assembly as in claim 1 wherein said light detector is selected from the group consisting of a photodiode, a photoconductor and a phototransistor.

9. The assembly as in claim 6 wherein said light source emits a wavelength of between about 750 nm and about 1600 nm.

10. The assembly as in claim 1 further comprising:
    (e) a local processor which communicates with each of said microprocessor units,
    (f) a software for intruder pattern recognition running on said local processor and
    (g) a database comprising stored images of intruding objects accessible to said local processor.

11. The claim as in claim 10 wherein said database resides in a storage medium which is attached to said local processor.

12. The assembly as in claim 10 further comprising:
    (h) a photovoltaic solar panel for harvesting solar radiation to enable the operation of the system in the dark and in a stand-alone mode,
    (i) an electrical storage device which is charged by said photovoltaic solar panel,
    (j) an RF communication network between said post and a control center.

13. The assembly as in claim 12 further comprising:
    (k) a mechanism for rotating a first section and a second section of said post to facilitate optical alignment of said at least first array toward said at least second array,
    (l) a mechanism for flipping up and down said transceiver to facilitate optical alignment of said transceiver with a transceiver of an adjacent post,
    (m) a mechanism for moving said post along two azimuthally orthogonal directions, and
    (n) a mechanism for elevating said section of said post with respect to ground.

14. The assembly as in claim 5 wherein said post is equipped with a short range protection mechanism.

15. A method for operating an assembly of an anti-intruder system which sets up an alarm when being breached comprising the steps of:
    (a) providing at least a first and a second array having each a multiplicity of infra-red optical transceivers, each transceiver includes a light source and a light detector, the arrays are mounted oppositely and facing, each other in a master/slave configuration, wherein the light detector of each transceiver of said at least first and second arrays is illuminated by more than a single light source of said transceiver of said opposite array,
    (b) adjusting intensity of the light emitted by said light source of said transceiver of said master array in response to a level of illumination received by said light detector of said transceiver of said slave array and
    (c) identifying an origin light source among said light sources of said master array and a destination light detector among said light detectors of said slave array of a light beam which was blocked by an intruding object.

16. The method as in claim 15 wherein said at least first and second arrays are positioned on adjacent posts.

17. The method as in claim 15 wherein said light source is selected from the group consisting of a LED and a laser in the IR region.

18. The method as in claim 15 wherein said illumination includes pulsed illumination.

19. The method as in claim 15 wherein said light detector is selected from the group consisting of a photodiode, a photoconductor and a phototransistor.

20. The method as in claim 17 wherein said light emits a wavelength of between about 750 nm and about 1600 nm.

21. The method as in claim 15 wherein said adjusting and said identifying is accomplished by using a microprocessor.

22. The method as in claim 15 wherein said intensity of light is set between an upper and a lower threshold value.

23. The method of claim 15 further comprising the steps of:
    (d) constructing an image of said intruding object in accordance to said identifying of an origin light source among said light sources and a destination light detector among said light detectors of a light beam which was blocked by an intruding object,
    (e) comparing said constructed image to reference images stored in a database,
    (f) evaluating the nature of said intruding object in accordance to the outcome of said comparison and,
    (g) reporting said evaluation to a control center.

24. The method as in claim 23 wherein an operation selected from the group consisting of said constructing, comparing, evaluating and reporting is accomplished using a local processor which runs a pattern recognition software.

25. The method as in claim 24 wherein said database is stored in a storage medium accessible to said local processor.

26. The method as in claim 23 wherein said reporting is via an RF communication network to a central processor located in a central control room.

27. An anti-intruder system, which sets up an alarm when being breached, the system comprises of plurality of posts deployed apart forming, a peripheral fence, each post carries at least a first master optical array and at least a second slave optical array, each optical array has a multiplicity of infra-red transceivers, each transceiver includes a light source and a light detector, the master array is mounted oppositely to and facing the slave array of an adjacent post, wherein the light detector of each transceiver of either optical array is illuminated by more than a single light source of the transceiver of the opposite optical array and the intensity of illumination of each light source of the transceiver of the master optical array is automatically adjusted according to the light intensity arriving to the light detector of the transceiver of the slave optical array, the system identifies an intrusion event by recognizing an origin light source and a destination light detector of a light beam which is blocked by an intruding object.

28. The system of claim 27 wherein an intruder image is formed in accordance to said recognizing of an origin light source and of a destination light detector of a light beam which was blocked by an intruding object.

29. The system of claim 27 wherein a post among said plurality of posts is equipped with a photovoltaic solar panel and an electrical storage device to enable a stand-alone operation of said system.

30. The system of claim 27 wherein a post among said plurality of posts is equipped with alignment mechanisms to optimize optical communication between said transceiver of said master array on said post and said transceiver of said slave array on said adjacent post.

31. The system of claim 27 wherein a post among said plurality of posts is communicating to a control center via an RF communication link.

\* \* \* \* \*